(12) United States Patent
Schoonover

(10) Patent No.: US 11,541,815 B2
(45) Date of Patent: Jan. 3, 2023

(54) HYBRID RUNNING BOARD

(71) Applicant: Vintech Industries, Inc., Imlay City, MI (US)

(72) Inventor: James C. Schoonover, Shelby Township, MI (US)

(73) Assignee: Vintech Industries, Inc., Imlay City, MI (US)

(*) Notice: Subject to any disclaimer, the term of this patent is extended or adjusted under 35 U.S.C. 154(b) by 42 days.

(21) Appl. No.: 16/876,631

(22) Filed: May 18, 2020

(65) Prior Publication Data

US 2020/0361386 A1    Nov. 19, 2020

Related U.S. Application Data

(60) Provisional application No. 62/849,444, filed on May 17, 2019.

(51) Int. Cl.
*B60R 3/00* (2006.01)

(52) U.S. Cl.
CPC .................... *B60R 3/002* (2013.01)

(58) Field of Classification Search
CPC .................................................. B60R 3/002
See application file for complete search history.

(56) References Cited

U.S. PATENT DOCUMENTS

| | | | | |
|---|---|---|---|---|
| 4,203,611 A * | 5/1980 | Makela | .................... | B60R 3/002 280/163 |
| 4,257,620 A * | 3/1981 | Okland | .................. | B60R 3/002 280/164.1 |
| 4,311,320 A * | 1/1982 | Waters, Jr. | .............. | B60R 3/002 108/44 |
| 4,557,494 A * | 12/1985 | Elwell | .................... | B60Q 1/323 24/514 |
| 4,934,721 A * | 6/1990 | Flores | ..................... | B60R 3/002 182/90 |
| 5,806,869 A * | 9/1998 | Richards | ................. | B60R 3/002 280/163 |
| 6,267,398 B1 * | 7/2001 | Lombard | ................ | B60R 3/002 14/2.4 |
| 9,937,865 B1 * | 4/2018 | Oakey | ..................... | B60R 3/002 |
| 10,518,727 B1 * | 12/2019 | Barbuta | .................. | B60R 19/42 |
| 2002/0195792 A1 * | 12/2002 | Hendrix | ................. | B60R 3/002 280/164.1 |
| 2005/0067741 A1 * | 3/2005 | Chapman | ................ | B29C 49/20 264/516 |
| 2005/0093266 A1 * | 5/2005 | Smith | ..................... | B60R 3/002 280/163 |
| 2005/0263974 A1 * | 12/2005 | Mulder | ..................... | B60R 3/00 280/163 |
| 2007/0296175 A1 * | 12/2007 | Flajnik | ..................... | B60R 3/002 280/169 |
| 2013/0323454 A1 * | 12/2013 | Chapman | ................ | B60R 19/03 428/74 |
| 2017/0036596 A1 * | 2/2017 | Yang | ..................... | B60Q 1/2696 |
| 2017/0166135 A1 * | 6/2017 | Baskin | .................... | B60R 3/002 |
| 2018/0065559 A1 * | 3/2018 | Michie | .................... | B60R 3/002 |
| 2019/0047477 A1 * | 2/2019 | Crandall | ................ | B60Q 1/323 |
| 2019/0084482 A1 * | 3/2019 | Long | ........................ | B60R 3/02 |

(Continued)

*Primary Examiner* — Jeffrey J Restifo
(74) *Attorney, Agent, or Firm* — Warn Partners, P.C.

(57) ABSTRACT

A two-piece manufacturing process for making a running board of a vehicle with two extruded halves, one aluminum and one polymer. The upper half is aluminum and the lower half polymer.

7 Claims, 3 Drawing Sheets

(56) References Cited

U.S. PATENT DOCUMENTS

| | | | |
|---|---|---|---|
| 2019/0092226 A1* | 3/2019 | Chen | B60Q 1/323 |
| 2020/0130762 A1* | 4/2020 | Crandall | B60R 19/42 |
| 2020/0361386 A1* | 11/2020 | Schoonover | B60R 3/002 |
| 2021/0213884 A1* | 7/2021 | Dellock | B32B 7/12 |
| 2021/0221449 A1* | 7/2021 | Milani | B60R 3/002 |
| 2021/0323480 A1* | 10/2021 | Long | B61D 23/025 |

\* cited by examiner

HYBRID RUNNING BOARD

CROSS-REFERENCE TO RELATED APPLICATIONS

This application claims the benefit of U.S. Provisional Patent Application No. 62/849,444, filed May 17, 2019. The disclosure of the above application is incorporated herein by reference.

FIELD OF THE INVENTION

The present invention relates to a two-piece manufacturing concept for making a running board of a vehicle with two extruded halves, one aluminum and one polymer.

BACKGROUND OF THE INVENTION

Running board step members must be sturdy in order to support the weight of one or more passengers getting in and out of the vehicle. So called "nerf" bars are sometimes used for running boards. These are typically heavy-duty tubes which are sturdy but heavy in nature and also require much in the way of manufacturing.

Other running board steps are also used but do not facilitate high quantity manufacturing and therefore are expensive to produce in the numbers required in the automotive industry.

Therefore, there is a need in the art to provide a sturdy, lightweight and easy to manufacture running board.

SUMMARY OF THE INVENTION

In accordance with the present invention there is provided a two-piece manufacturing process for making a running board of a vehicle with two extruded halves, one aluminum and one polymer. The upper half is aluminum and the lower half polymer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
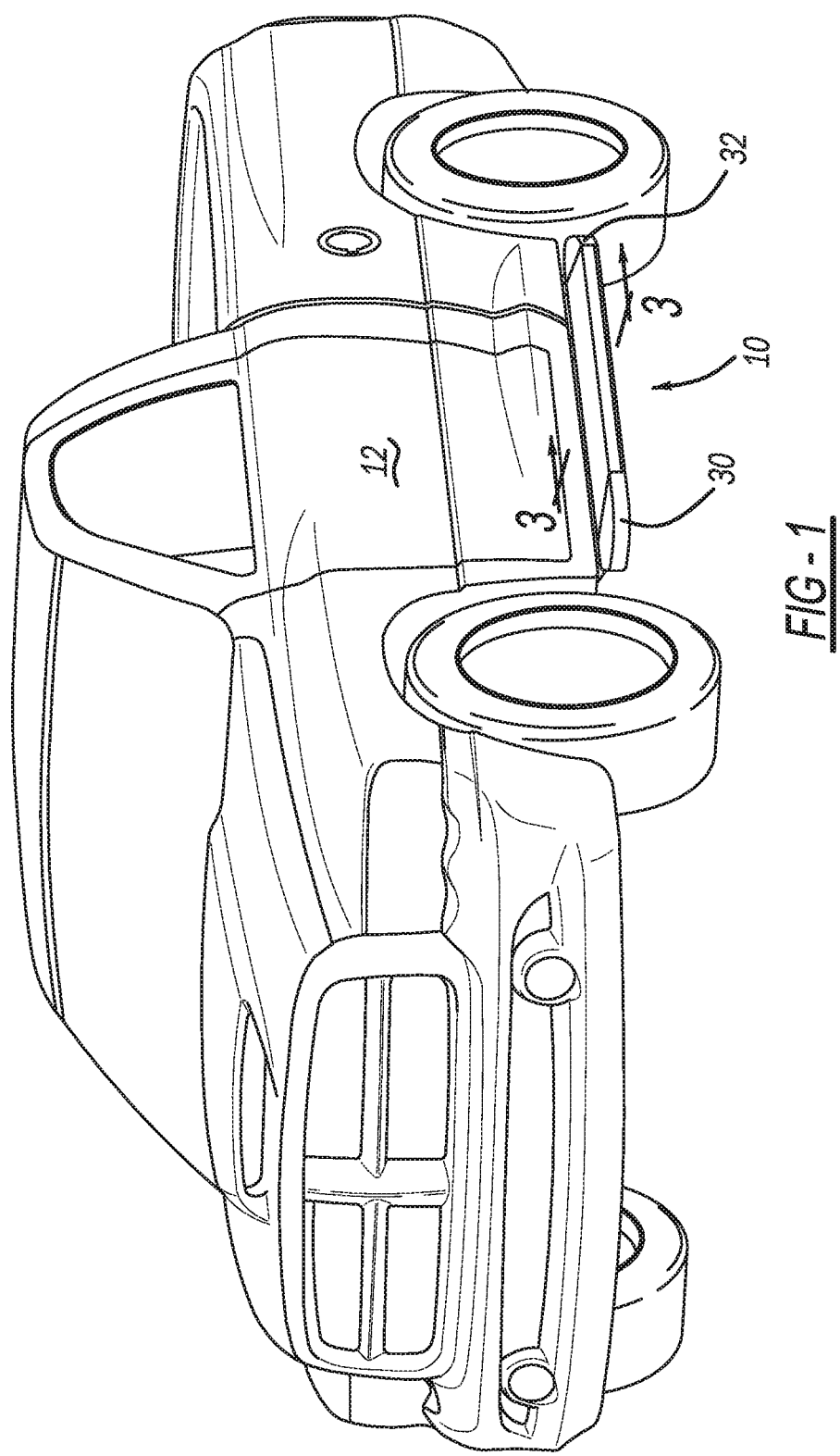
FIG. 1 is a perspective view of a vehicle having a running board in accordance with the present invention.
Figure 2:
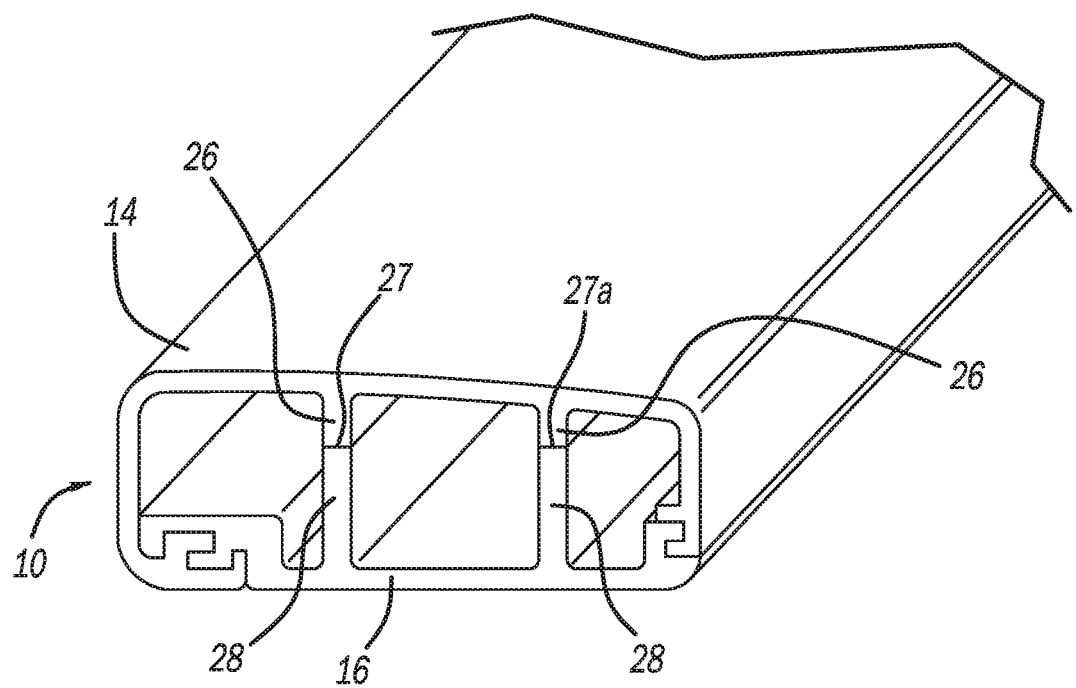
FIG. 2 is an end view of the running board of the present invention.
Figure 3:
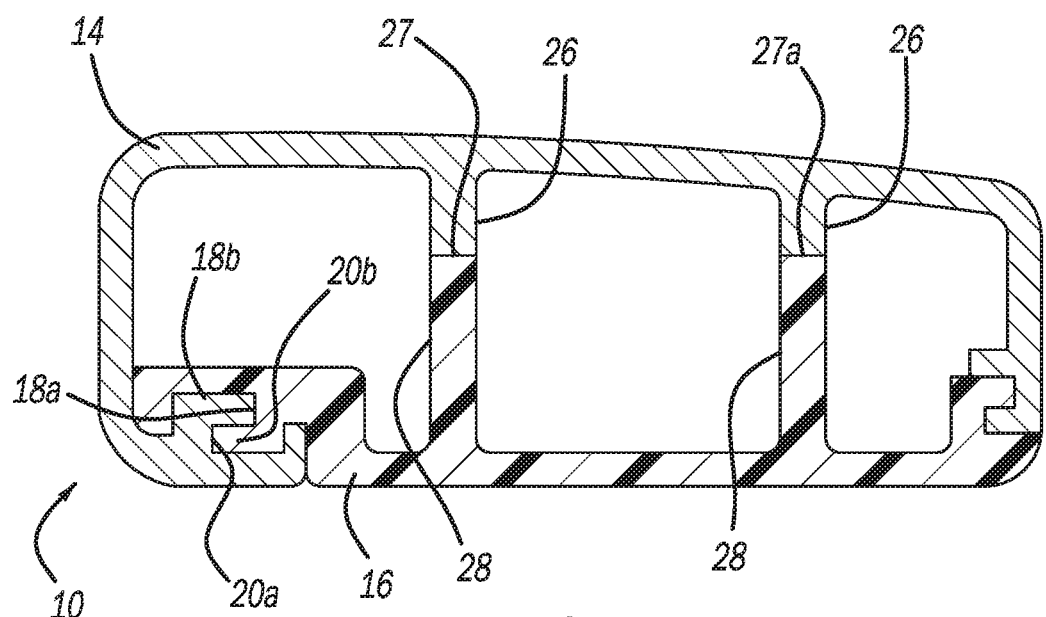
FIG. 3 is a section taken along line 3-3 of the running board of the present invention; and, FIG. 4 is an exploded view of the two pieces of the running board of the present invention being assembled.

The following description of the preferred embodiment(s) is merely exemplary in nature and is in no way intended to limit the invention, its application, or uses.

In accordance with the present invention there is provided a two-piece running board general shown at 10 and manufacturing process for making a running board 10 for a vehicle 12 with two extruded halves 14, 16, one aluminum 14 and one polymer 16. The upper half step section 14 is an extruded aluminum section 14 and the second lower half is an extruded polymer section 16.

Figure 4:
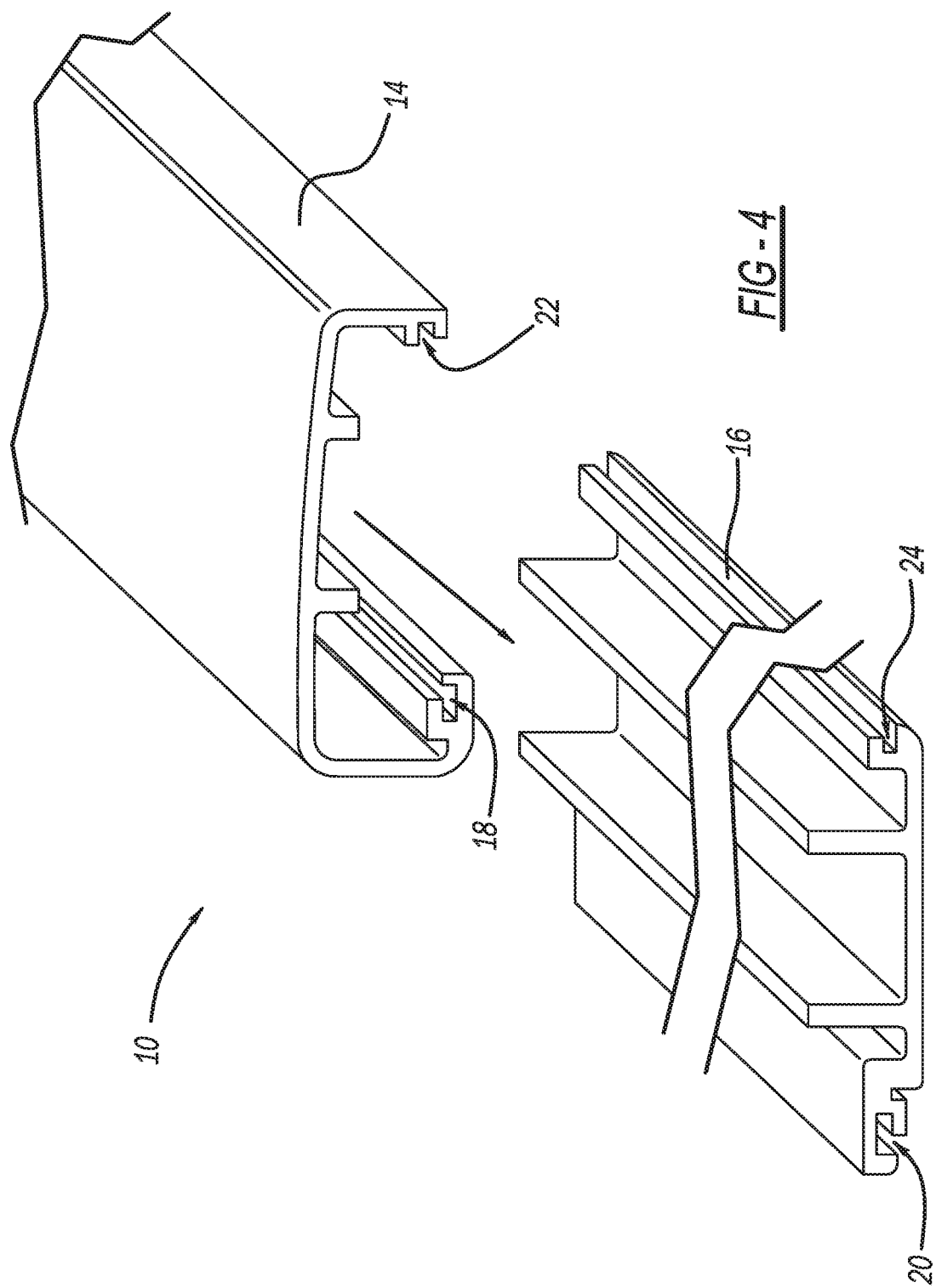

The two-piece running board assembly 10 includes a step section 14 made of an extruded metal material as set forth above. The step section including at least one locking channel generally indicated at 18 along the length of the extrusion. The second extruded polymer section 16 has a cooperative mating channel generally indicated at 20 which is sliceable into the at least one locking channel 18 as shown in FIG. 4. A second locking channel generally indicated at 22 in the first step section 14 and a mating channel 24 in said second extruded polymer section 16 for providing slideable attachment between the first step section 14 and the extruded polymer section 16.

The assembly 10 includes at least one reinforcement rib 26 extending from said step section 14 and a corresponding reinforcement rib 28 extending from said extruded polymer section 16 which meet at interface 27 and 27a to reinforce each other.

Locking channels 18 and 20 define an "L" shaped slot portion 18a, 20a and a corresponding "L" shaped male portion 18b, 20b which cooperatively slide into one another.

In practice extended lengths of the section 14 are extruded from suitable aluminum. The aluminum extrusion is cut to proper running board length and is preferably anodized to a suitable color and finished however desired. A corresponding length of the extruded member 16 which has been extruded from a structural material such as a glass filled polypropylene is cut to match. The pieces are slid into one another and suitably attached to one another via fasteners or epoxy or other adhesives or in some constructions a suitable interference fit is provided. Vehicle mounting features and end caps 30 and 32 are attached and the running boards can be mounted to the vehicle 12.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A two-piece running board assembly comprising a first step section made of an extruded metal material, said first step section including at least one locking channel along the length of the extrusion, a second extruded polymer section having a cooperative mating channel which is adapted to be slideable longitudinally via an open end into the at least one locking channel; and a second locking channel in said first step section that is substantially U-shaped, and a second mating channel in said second extruded polymer section configured for providing longitudinally slideable attachment between the first step section and the extruded polymer section.

2. The two-piece running board assembly of claim 1 further comprising at least one reinforcement rib extending from said step section and a corresponding reinforcement rib extending from said extruded polymer section.

3. The two-piece running board assembly of claim 1 wherein each of said channels include an L-shaped channel portion and a corresponding L-shaped male portion which cooperatively slide into one another.

4. A process for providing a two-piece running board assembly comprising extruding a step section made of an extruded metal material, said step section including at least one locking channel along the length of the extrusion and extruding a second extruded polymer section having a cooperative mating channel and sliding the step section longitudinally only via an open end into the second extruded polymer section utilizing the at least one locking channel for forming a running board for a vehicle.

5. The process for providing a two-piece running board assembly of claim 4 further comprising a second locking channel in said first step section and a mating channel in said second extruded polymer section for providing slideable attachment between the first step section and the extruded polymer section.

6. The process for providing a two-piece running board assembly of claim 4 further comprising at least one reinforcement rib extending from said step section and a corresponding reinforcement rib extending from said extruded polymer section.

7. The process for providing a two-piece running board assembly of claim 4 wherein each of said channels include an L-shaped channel portion and a corresponding L-shaped male portion which cooperatively slide into one another.

\* \* \* \* \*